US012806928B2

(12) United States Patent
Yamaguchi et al.

(10) Patent No.: US 12,806,928 B2
(45) Date of Patent: Nov. 24, 2026

(54) RECORDING APPARATUS

(71) Applicant: CANON KABUSHIKI KAISHA, Tokyo (JP)

(72) Inventors: Shuhei Yamaguchi, Kanagawa (JP); Atsushi Kohnotoh, Tokyo (JP); Ken Takenaga, Kanagawa (JP); Takashi Abe, Kanagawa (JP); Daiju Takeda, Kanagawa (JP); Kousuke Tanaka, Kanagawa (JP); Yusuke Naratani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 126 days.

(21) Appl. No.: 18/770,024

(22) Filed: Jul. 11, 2024

(65) Prior Publication Data

US 2025/0033391 A1 Jan. 30, 2025

(30) Foreign Application Priority Data

Jul. 28, 2023 (JP) ................................ 2023-122942

(51) Int. Cl.

| | |
|---|---|
| ***B41J 25/34*** | (2006.01) |
| ***B41J 2/175*** | (2006.01) |
| ***B41J 25/00*** | (2006.01) |
| ***B41J 29/13*** | (2006.01) |

(52) U.S. Cl.

CPC ............. *B41J 25/34* (2013.01); *B41J 2/1752* (2013.01); *B41J 25/001* (2013.01); *B41J 29/13* (2013.01)

(58) Field of Classification Search

CPC ........ B41J 25/34; B41J 2/1752; B41J 25/001; B41J 29/13; B41J 29/02

See application file for complete search history.

(56) References Cited

U.S. PATENT DOCUMENTS

| | | | |
|---|---|---|---|
| 10,576,745 | B2 | 3/2020 | Kohnotoh |
| 10,596,820 | B2 | 3/2020 | Abe |
| 10,632,758 | B2 | 4/2020 | Kosuge |
| 10,792,913 | B2 | 10/2020 | Kohnotoh |
| 10,843,473 | B2 | 11/2020 | Kurata |
| 10,899,134 | B2 | 1/2021 | Kida |
| 10,919,291 | B2 | 2/2021 | Kohnotoh |
| 10,946,663 | B2 | 3/2021 | Kohnotoh |

(Continued)

FOREIGN PATENT DOCUMENTS

| | | | |
|---|---|---|---|
| JP | 3948959 | B2 | 7/2007 |

*Primary Examiner* — Justin Seo

(74) *Attorney, Agent, or Firm* — Venable LLP

(57) ABSTRACT

A recording apparatus including a carriage configured to carry a recording head that discharges a liquid, the carriage including a main body which is provided with an opening for internally housing the recording head and which includes a locking portion and a cover which is rotatable between a closed state, in which the opening is blocked, and an open state, which exposes the opening, and which includes a locked portion that engages with the locking portion in the closed state. The cover includes an operating portion including a protruded portion which protrudes, from a surface constituting an outer wall surface of the carriage, in a rotating direction of the cover from the closed state to the open state, the operating portion having an attitude which changes so that an engagement between the locked portion and the locking portion is released due to the protruded portion being pressed.

18 Claims, 7 Drawing Sheets

(56) References Cited

U.S. PATENT DOCUMENTS

| | | | | |
|---|---|---|---|---|
| 10,960,678 | B2 | 3/2021 | Kosuge | |
| 11,104,164 | B2 | 8/2021 | Kohnotoh | |
| 11,203,204 | B2 | 12/2021 | Abe | |
| 11,460,794 | B2 | 10/2022 | Mukoyama | |
| 11,518,174 | B2 | 12/2022 | Kurata | |
| 11,618,264 | B2 | 4/2023 | Kosuge | |
| 11,712,900 | B2 | 8/2023 | Tanaka | |
| 11,807,018 | B2 | 11/2023 | Abe | |
| 11,987,059 | B2 | 5/2024 | Kosuge | |
| 12,070,936 | B2 | 8/2024 | Abe | |
| 12,115,789 | B2 | 10/2024 | Kohnotoh | |
| 2009/0278902 | A1 * | 11/2009 | Iwata | B41J 25/34 347/87 |
| 2010/0034558 | A1 | 2/2010 | Koya | |
| 2011/0063383 | A1 * | 3/2011 | Tsukuda | B41J 2/17509 347/86 |
| 2017/0120603 | A1 * | 5/2017 | Shimmachi | B41J 2/175 |
| 2022/0111652 | A1 | 4/2022 | Araki | |
| 2023/0322004 | A1 | 10/2023 | Tanaka | |
| 2024/0083175 | A1 | 3/2024 | Tsutsumi | |
| 2024/0083183 | A1 | 3/2024 | Naratani | |
| 2024/0116302 | A1 | 4/2024 | Kohnotoh | |

* cited by examiner

RECORDING APPARATUS

BACKGROUND OF THE INVENTION

Field of the Invention

The present invention relates to a recording apparatus.

Description of the Related Art

Conventionally, a recording apparatus including a recording head and a carriage which supports the recording head is known. Japanese Patent No. 3948959 discloses a configuration provided with an openable and closable cover which rotates relative to a main body of a carriage. In the configuration described above, the cover is engaged with the main body when the cover is in a closed state and a user can open the cover by releasing the engagement.

SUMMARY OF THE INVENTION

In the configuration described above, the user has to release the engagement by directly touching an engaging portion between the main body and the cover. However, since the engaging portion is positioned inside the recording apparatus and the user cannot release the engagement without inserting a finger into the recording apparatus, there is room for improvement in terms of operability of the cover.

The present invention has been made in consideration of the problem described above and an object thereof is to provide a recording apparatus capable of improving operability.

In order to achieve the object described above, a recording apparatus according to the present invention includes:

- a carriage configured to carry a recording head that discharges a liquid, the carriage including:
  - a main body which is provided with an opening for internally housing the recording head and which includes a locking portion; and
  - a cover which is rotatable between a closed state, in which the opening is blocked, and an open state, which exposes the opening, and which includes a locked portion that engages with the locking portion in the closed state,
- wherein the cover includes an operating portion including a protruded portion which protrudes, from a surface constituting an outer wall surface of the carriage, in a rotating direction of the cover from the closed state to the open state, the operating portion having an attitude which changes so that an engagement between the locked portion and the locking portion is released due to the protruded portion being pressed.

According to the present invention, a recording apparatus capable of improving operability can be provided.

Further features of the present invention will become apparent from the following description of exemplary embodiments with reference to the attached drawings.

DESCRIPTION OF THE EMBODIMENTS

Figure 1:
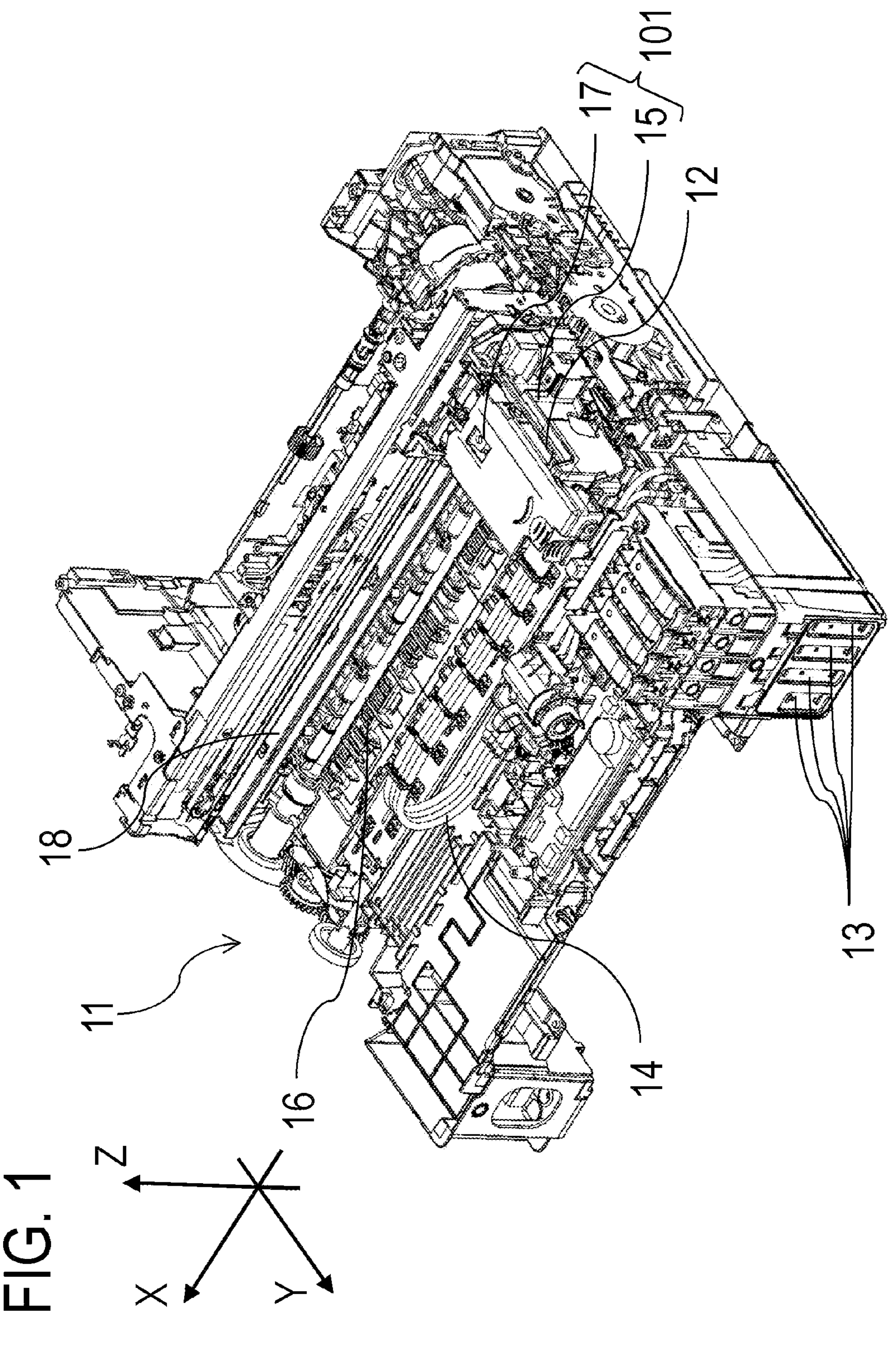
FIG. 1 is a perspective view showing an internal configuration of a recording apparatus according to a first embodiment.

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

While a plurality of features are described in the following embodiments, all of the plurality of features are not necessarily essential to the invention and the plurality of features may be combined with each other in any way. Moreover, in the accompanying drawings, a same reference numeral will be assigned to a same or similar component and overlapping descriptions will be omitted.

First Embodiment

Recording Apparatus

First, a schematic configuration of a recording apparatus 11 according to a first embodiment of the present invention will be described. FIG. 1 is a perspective view showing an internal configuration of the recording apparatus 11 according to the first embodiment of the present invention. While the recording apparatus 11 according to the first embodiment is an inkjet recording apparatus which discharges ink to perform recording on a recording medium, the present invention can also be applied to various recording apparatuses other than inkjet recording apparatuses. In the drawing, an X direction and a Y direction depicted by arrows are directions that intersect with each other and, in the first embodiment, the directions are orthogonal to each other. AZ direction represents an up-down direction (a direction of gravitational force). The X direction is a width direction of the recording apparatus 11 (left-right direction, a width direction of a recording medium). The Y direction is a depth direction of the recording apparatus 11 (a near-to-far direction or a far-to-near direction).

Note that “recording” is not limited to forming significant information such as characters and graphics and also includes cases of forming a wide variety of significant and insignificant images, designs, patterns, and the like on a recording medium or processing the medium and the “recording” may or may not be made visible so as to be visually perceivable by a human being. In addition, while a sheet of paper is assumed as the “recording medium” in the present embodiment, the “recording medium” may be a piece of cloth, a piece of plastic, a piece of film, or the like.

The recording apparatus 11 includes a recording head 12 which discharges ink to a recording medium, an ink tank 13 which stores ink to be supplied to the recording head 12, and a carriage 101 on which the recording head 12 is attachably and detachably mounted and which reciprocates in a main scanning direction (X direction). In addition, the recording apparatus 11 includes a supply tube 14 which forms an ink supply path for supplying ink from the ink tank 13 to the recording head 12. The carriage 101 includes a main body 15 which internally houses the recording head 12 and a cover 17 being a headset cover member which covers the main body 15 from above. In a state where the cover 17 is open, a user can attach/detach the recording head 12 to/from the carriage 101.

The recording apparatus 11 includes a plurality of rollers (conveying means) which feed a sheet-like recording medium. The recording medium is conveyed by the plurality of rollers in a conveying direction which is orthogonal to a movement direction (main scanning direction) of the carriage 101 (recording head 12). In addition, a platen 16 which supports the recording medium is provided below a range of movement of the recording head 12 so as to oppose the recording head 12. In the first embodiment, a recording operation by the recording head 12 is performed while the recording medium is being conveyed in the far-to-near direction (the Y direction from a far side to a near side).

The recording head 12 according to the first embodiment is a recording head which discharges ink supplied from the ink tank 13 to the recording medium and performs recording. The recording head 12 has a discharge surface on which a plurality of nozzles which discharge ink are formed. The discharge surface is arranged so as to oppose the platen 16. Each nozzle is provided with, for example, an electric thermal conversion element (heater). The electric thermal conversion element generates heat when energized to foam the ink and discharges the ink using the foaming energy. The recording head 12 may be structured to discharge ink using a piezoelectric element instead of the electric thermal conversion element.

The carriage 101 is driven by a motor and a belt 18 and reciprocates in the main scanning direction. An image is recorded on the recording medium on the platen 16 as ink is discharged to the recording medium from the recording head 12 while the carriage 101 moves in the main scanning direction.

As described above, the recording apparatus 11 according to the first embodiment is a serial inkjet recording apparatus in which the recording head 12 is mounted to the carriage 101 that reciprocates in the X direction. However, the present invention is also applicable to other recording apparatuses including an inkjet recording apparatus equipped with a so-called full-line recording head in which a plurality of nozzles that discharge liquid are provided in a region corresponding to a width of a recording medium.

Ink Tank

Figure 2:
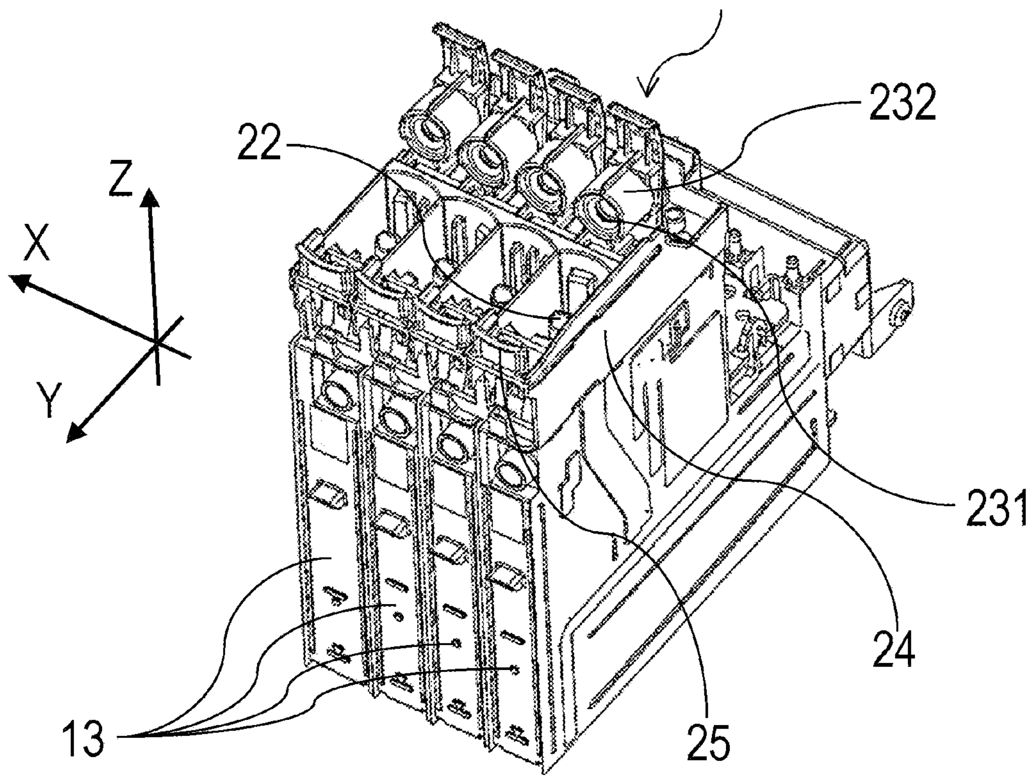
FIG. 2 is a perspective view of an ink tank and peripheral members according to the first embodiment.

Next, a configuration of the ink tank 13 and peripheral members thereof will be described. FIG. 2 is a perspective view showing the ink tank 13 and peripheral members thereof. The ink tank 13 is an ink housing portion provided so as to correspond to each ink color and, in the first embodiment, four ink tanks 13 are provided in the recording apparatus 11. A supply tube 14 for supplying ink of each color is attached to each ink tank 13. An ink inlet 22 is opened in an upper part of the ink tank 13 and, when ink is not being injected, the ink inlet 22 is sealed by a plug member 231 of a plug portion 23. In addition, the ink tank 13 is supported by a housing portion 24.

The plug portion 23 includes the plug member 231 which seals the ink inlet 22 and a holding member 232 which holds the plug member 231. The housing portion 24 is provided with a shaft portion, the holding member 232 includes an engaging portion which engages with the shaft portion, and the holding member 232 is supported by the housing portion 24 so as to be rotatable with respect to the housing portion 24.

The plug portion 23 is locked by an operating portion 25 in a state where the ink inlet 22 is sealed by the plug member 231. By operating the operating portion 25 and releasing the lock of the plug portion 23 by the operating portion 25, the user can rotate the holding member 232. The user can inject ink into the ink tank 13 by opening the holding member 232 to remove the plug member 231 sealing the ink inlet 22 from the ink inlet 22 and opening the ink inlet 22.

Carriage

Figure 3B:
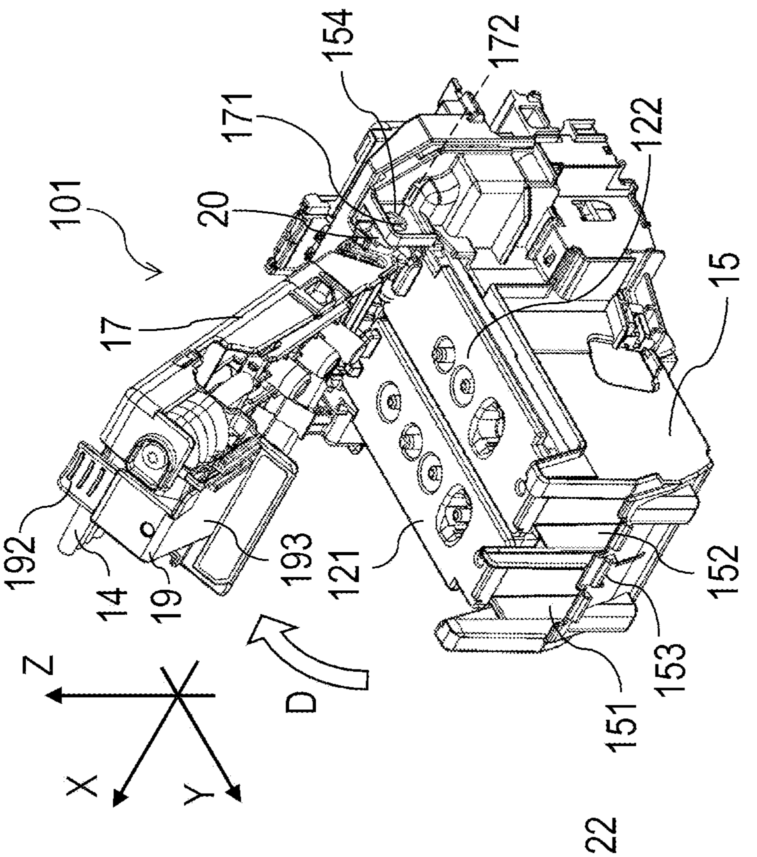
FIGS. 3A and 3B are perspective views of a carriage according to the first embodiment.
Figure 3A:
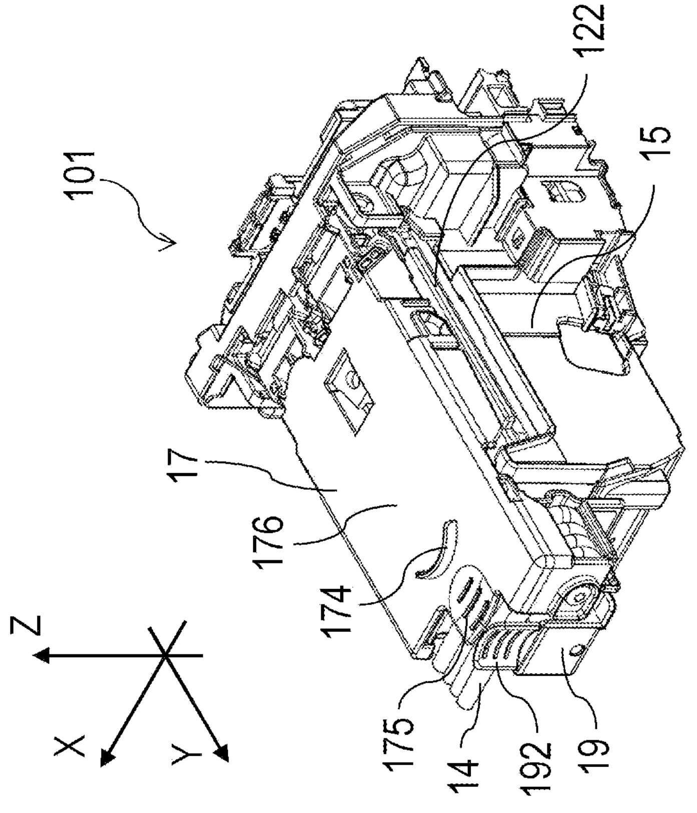
Figure 4:
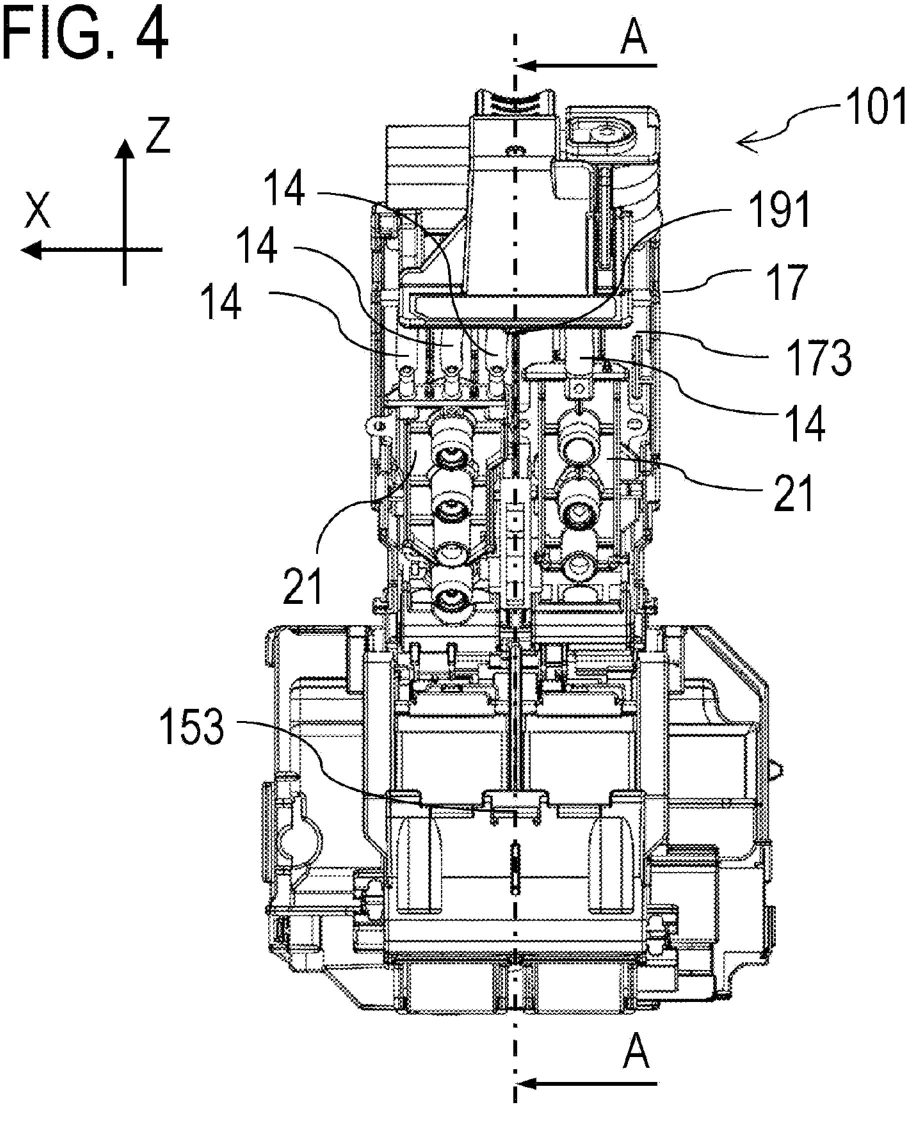
FIG. 4 is a front view of the carriage according to the first embodiment.

Next, a structure of the carriage 101 and peripheral members thereof will be described. FIGS. 3A and 3B are perspective views showing a periphery of the carriage. FIG. 3A shows a state where the recording head is being urged and FIG. 3B shows a state where the recording head is being replaced. FIG. 4 is a front view showing a periphery of the carriage in a state where the recording head is being replaced.

In the first embodiment, the carriage 101 supports the recording head 12 in plurality. Specifically, two types of recording heads 12 including a recording head 121 and a recording head 122 are supported. The recording head 121 is a recording head which discharges a cyan ink, a magenta ink, and a yellow ink. The recording head 122 is a recording head which discharges a black ink. In the first embodiment, the recording head 12 is replaceably (attachably and detachably) supported by the carriage 101. Since the recording head 12 is replaceable, formally, besides referring to the recording head 12 and other parts of an apparatus main body as the recording apparatus 11, only the apparatus main body may be referred to as the recording apparatus 11. The recording head 12 has a rectangular parallelepiped shape as a whole and the ink discharge surface is provided in a bottom portion in a state where the recording head 12 is being supported by the carriage 101.

The carriage 101 includes the main body 15 in which a head housing portion 151 which houses the recording head 121 and a head housing portion 152 which houses the recording head 122 are formed and the cover 17 which is rotatably supported with respect to the main body 15. Openings of the head housing portion 151 capable of internally housing the recording head 121 and the head housing portion 152 capable of internally housing the recording head 122 are respectively provided above the main body 15. The head housing portion 151 and the head housing portion 152 are arranged side by side in the X direction and the recording head 121 and the recording head 122 are arranged side by side in the X direction. The carriage 101 includes an opening in the bottom portion thereof and the respective discharge surfaces of the recording head 121 and the recording head 122 are exposed to outside (to below) of the carriage 101. A locking portion 153 which keeps the cover 17 in a closed state is provided in a front portion (an end in the Y direction) of the carriage 101.

The cover 17 is a rotating member which is rotatably supported by the main body 15. The cover 17 is configured to be rotatable between an open state (open position) in which the opening of the main body 15 is exposed and which enables the recording head 12 to be replaced and a closed state (closed position) in which the recording head 12 is covered together with the main body 15 and which blocks the opening of the main body 15. In FIG. 3B, a rotating direction D in which the cover 17 rotates from the closed state to the open state is depicted by a blank arrow. In addition, in the following description, in a radial direction during rotation of the cover 17, a side on which a center of rotation (a rotation center line 172) is positioned will be referred to as a basal side and an opposite side to the basal side will be referred to as a distal end side.

An operating member 19 is connected to the distal end side during rotation of the cover 17. The operating member 19 is a headset opening member including a locked portion 191 to be locked by the locking portion 153 and a protruded portion 192 which protrudes in the rotating direction D from the cover 17.

When viewed in a direction of a rotational axis of the cover 17, the locked portion 191 has a claw shape which protrudes in a direction intersecting with the rotating direction of the cover 17 and the locked portion 191 is configured to be engageable with the locking portion 153 which protrudes toward the front of the recording apparatus 11. When the cover 17 is in the closed state, the locked portion 191 is locked by the locking portion 153 and rotation in the rotating direction D of the cover 17 from the closed state to the open state is obstructed. Due to such a configuration, the cover 17 is kept in the closed state during a recording operation and the like.

The protruded portion 192 is an operating portion to be operated by the user in order to release the engagement between the locking portion 153 and the locked portion 191. By pressing the protruded portion 192 in the near-to-far direction (Y direction) of the recording apparatus 11 when the cover 17 is in the closed state, the engagement between the locking portion 153 and the locked portion 191 is released and the cover 17 becomes rotatable in the rotating direction D. Opening/closing operations of the cover 17 will be described in detail later.

In the first embodiment, the cover 17 protrudes toward the front from the main body 15 and the operating member 19 is connected to a forward end of the cover 17. When the cover 17 is in the closed state, the locked portion 191 is positioned at a lower end of the operating member 19 and the protruded portion 192 is positioned at an upper end of the operating member 19. When the cover 17 is in the closed state, the protruded portion 192 is positioned at an end toward the front of the carriage 101. The protruded portion 192 is given a shape in which a central portion in the width direction (X direction) is depressed in a direction toward the basal side from the distal end side of the cover 17, which readily accommodates a finger of the user, and which offers good operability.

The main body 15 of the carriage 101 is provided with two rotating shafts 154 which are separated from each other in the left-right direction (X direction). A bearing 171 which engages with each rotating shaft 154 is provided on each of left and right side wall portions of the cover 17. The cover 17 is supported by the rotating shafts 154 so as to be rotatable with respect to the main body 15 around the rotation center line 172 which is a center line of the rotating shafts 154. In the first embodiment, an extending direction of the rotation center line 172 is the X direction.

An urging member 20 which urges the cover 17 in the rotating direction D is provided in a vicinity of each rotating shaft 154. The urging member 20 is a torsion coil spring into which the rotating shaft 154 is inserted. In the first embodiment, when the protruded portion 192 of the operating member 19 is pressed, the engagement between the locking portion 153 and the locked portion 191 is released and the cover 17 automatically rotates to the open state due to urging of the urging member 20.

The cover 17 holds two connecting members 21. The connecting members 21 are arranged on an inner side of an upper wall portion 173 of the cover 17. When the cover 17 is in the closed state, the upper wall portion 173 assumes a form in which the recording head 12 is covered from above and the upper wall portion 173 can be described as a cover portion in terms of this form. When the cover 17 is in the closed state, the connecting members 21 are positioned between the upper wall portion 173 and the recording head 12.

The connecting members 21 are members which interconnect the recording head 12 and the supply tube 14. One connecting member 21 connects to the recording head 121 and the other connecting member 21 connects to the recording head 122. The supply tube 14 is provided for each type of ink and, in the first embodiment, a total of four supply tubes 14 are provided. Each supply tube 14 is connected to the ink tank 13 which houses the ink corresponding to each supply tube 14. Each supply tube 14 is an elongated flexible member and a supplying member which forms a supply passage of ink. Note that the connecting members 21 may be integrally formed with the cover 17 as connecting portions of the cover 17 to be connected to the supply tubes 14.

The operating member 19 includes a holding portion 193 which holds the supply tubes 14. Midway parts of the four supply tubes 14 are held and fixed by the holding portion 193 of the operating member 19. In addition, the operating member 19 can be attached to and detached from the cover 17 while holding the supply tubes 14. Furthermore, during opening/closing operations of the cover 17, the supply tubes 14 move together with the cover 17 and do not obstruct the opening/closing operations. Accordingly, serviceability and replaceability are improved.

In the first embodiment, the operating member 19 is colored differently from the main body 15 and the cover 17. Accordingly, visibility of the operating portion improves and operability of the cover 17 improves. While the entire operating member 19 is colored differently from the main body 15 and the cover 17 in the first embodiment, for example, only the protruded portion 192 may be colored differently from the main body 15 and the cover 17.

An upper surface 176 of the cover 17 which faces upward in a vertical direction when the cover 17 is in the closed state is provided with a hooking portion 174 to be hooked by a finger of the user. The hooking portion 174 is a protruded portion which protrudes in the rotating direction from the upper surface 176 and has an arc shape of which a central portion is depressed toward the front when viewed in a direction perpendicular to the upper surface 176. By providing the hooking portion 174, since the user can press the protruded portion 192 in the near-to-far direction while hooking a finger around the hooking portion 174, force can be exerted in a stable state and operability of the cover 17 is improved.

As described above, the carriage 101 is constituted of the main body 15, the cover 17, the operating member 19, and the connecting members 21 and holds the plurality of recording heads 12 inside the main body 15. The carriage 101 reciprocates in the main scanning direction while supporting the recording heads 12 and ink is supplied through the supply tubes 14 from the ink tanks 13 to the recording heads 12 being supported by the carriage 101.

In addition, the operating member 19 and the connecting members 21 are attached to the cover 17 and integrally rotate with the cover 17. The carriage 101 can also be considered as being constituted of a cover unit made up of the cover 17 which blocks the opening of the main body 15 as a cover main body, the operating member 19 which functions as an operating portion during an opening operation, and the connecting members 21 which function as connecting portions. In this case, the entire cover unit can be considered a single cover.

Opening/Closing Operations of Headset Cover

Figure 5C:
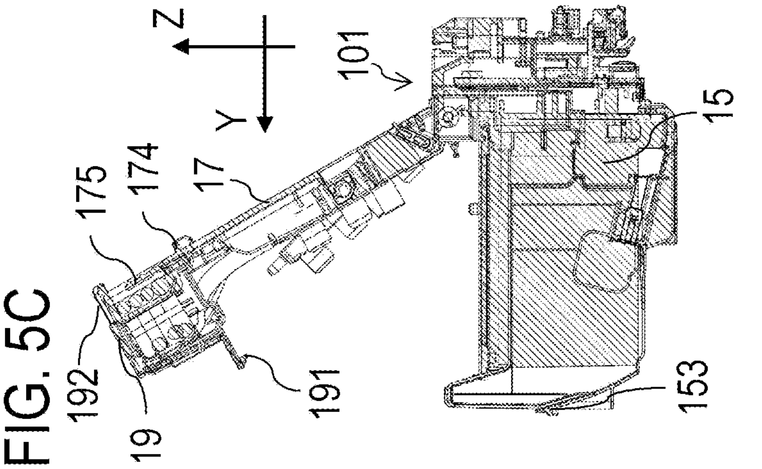
FIGS. 5A to 5C are explanatory diagrams of opening/closing operations of a cover of the carriage according to the first embodiment.
Figure 5B:
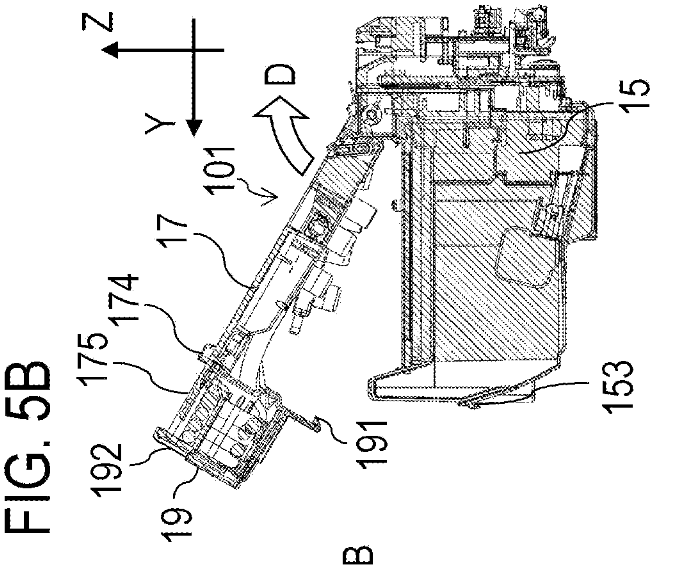
Figure 5A:
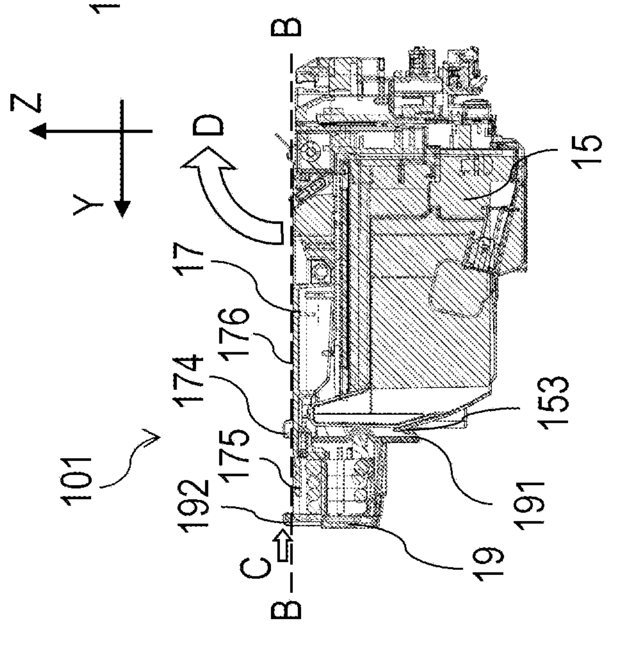

Next, opening/closing operations of the cover 17 with respect to the main body 15 will be described in detail. FIGS. 5A to 5C are explanatory diagrams of opening/closing operations of the cover 17 which are sectional views taken along A-A in FIG. 4 when viewing the carriage 101 in the X direction. FIG. 5A shows the cover 17 in the closed state, FIG. 5B shows the cover 17 at a position between the closed state and the open state, and FIG. 5C shows the cover 17 in the open state.

As described above, the cover 17 is kept in the closed state as the locked portion 191 of the operating member 19 connected to the cover 17 is locked by the locking portion 153 of the main body 15. In addition, when the protruded portion 192 which is a pressed portion (operating portion) is pressed, a locked state of the locked portion 191 by the locking portion 153 is released and the cover 17 rotates from the closed state to the open state by the urging force of the urging member 20.

The protruded portion 192 is provided in an upper portion of the operating member 19 and is positioned so as to partially protrude in the Z direction from a periphery of the carriage 101 and the cover 17. More specifically, the protruded portion 192 protrudes in the rotating direction D which is the direction in which the cover 17 rotates from the closed state to the open state with respect to the upper surface 176 of the cover 17. In the first embodiment, the upper surface 176 is a surface which constitutes an outer wall surface of the cover 17 and faces upward when the cover 17 is in the closed state. In FIG. 5A, a Z-direction position of the upper surface 176 is depicted by a B-B line and a pressing direction C of the protruded portion 192 for opening the cover 17 is depicted by a blank arrow. In addition, the protruded portion 192 is positioned at a near-side end of the carriage 101 in the Y direction.

First, an opening operation of the cover 17 will be described in detail. As shown in FIG. 5A, when the cover 17 is in the closed state, the locked portion 191 of the operating member 19 connected to the cover 17 is locked by the locking portion 153 of the main body 15.

In order to rotate the cover 17 in the rotating direction D, first, the user releases the locked state of the locking portion 153 and the locked portion 191. The locked state is released by pressing the protruded portion 192 in the near-to-far direction (the Y direction from the near side to the far side). When the protruded portion 192 is pressed in the near-to-far direction, an attitude of the operating member 19 changes so that the engagement between the locked portion 191 and the locking portion 153 is released. In the first embodiment, the pressing direction of the protruded portion 192 is a horizontal direction and is opposite to a conveying direction of the recording medium during a recording operation.

A configuration in which the attitude of the operating member 19 changes so that the engagement between the locked portion 191 and the locking portion 153 is released by pressing the protruded portion 192 can be realized by, for example, having the operating member 19 rotatably supported by the cover 17 around a rotational axis which extends in the X direction. When configuring the operating member 19 so as to be rotatable, an urging member such as a spring for urging the operating member 19 may be provided in order to fix the attitude of the operating member 19 in the closed state when the operating member 19 is not being pressed. Alternatively, for example, the operating member 19 may be configured so as to rotate in a clockwise direction in FIG. 3A as the protruded portion 192 is pressed in the near-to-far direction, with a contact portion of the operating member 19 with the cover 17 acting as a fulcrum. A mechanism for releasing the engagement between the locked portion 191 and the locking portion 153 in conjunction with pressing of the operating member 19 is not limited to those described above or illustrated and various mechanisms can be adopted.

Once the engagement between the locked portion 191 and the locking portion 153 is released, the cover 17 is urged in the rotating direction D by the urging member 20 and transitions to the open state. FIG. 5B shows a state midway through the transition of the cover 17 from the closed state to the open state. By having the urging member 20 urge the cover 17, a situation where a finger inadvertently gets caught between the cover 17 and the main body 15 during opening/closing operations of the cover 17 can be prevented. As for the opening operation of the cover 17, a configuration may be adopted in which the urging force of the urging member 20 is set large or small enough to assist an opening operation of the cover 17 which is performed by the user by lifting the cover 17.

When the cover 17 is in the open state, as shown in FIG. 5C, a space large enough to take the recording head 12 into and out from the head housing portions 151 and 152 is formed between the cover 17 and the main body 15. Since the cover 17 is kept in the open state by being urged by the urging member 20, the user can safely attach/detach the recording head 12 to/from the carriage 101. The configuration of keeping the cover 17 in the open state is not limited to the configuration described above and known stopper mechanisms or the like may be provided. Through the operations described above, the cover 17 rotates from the closed state to the open state and the carriage 101 changes to a state where the recording head 12 is attachable and detachable.

As a closing operation in which the cover 17 is rotated from the open state to the closed state, the opening operation described above need only be performed in reverse. By rotating the cover 17 to the closed state against the urging force of the urging member 20, the locked portion 191 and the locking portion 153 engage with each other and the cover 17 is kept in the closed state. An inclined surface which abuts the locking portion 153 during a closing operation is formed on the locked portion 191. The locked portion 191 engages with the locking portion 153 as the operating member 19 deforms or changes its attitude while the inclined surface of the locked portion 191 slides against the locking portion 153 with the closing operation of the cover 17. In other words, during a closing operation, the locked portion 191 and the locking portion 153 engage with each other as a so-called snap-fit configuration.

In addition, a depressed portion 175 which is depressed in an opposite direction to the rotating direction D is provided on the upper surface 176 of the cover 17. The depressed portion 175 is an operating portion (pressed portion) to be pressed by the user to operate the cover 17 during a closing operation of the cover 17. Since the depressed portion 175 is depressed in the opposite direction to the rotating direction D in a shape which readily accommodates the finger of the user during a closing operation of the cover 17, operability during a closing operation can be improved. In the first embodiment, the depressed portion 175 is provided at an end toward the front of the cover 17 and arranged at position which is readily reachable by the user and where force is readily transmittable to the cover 17.

Figure 6:
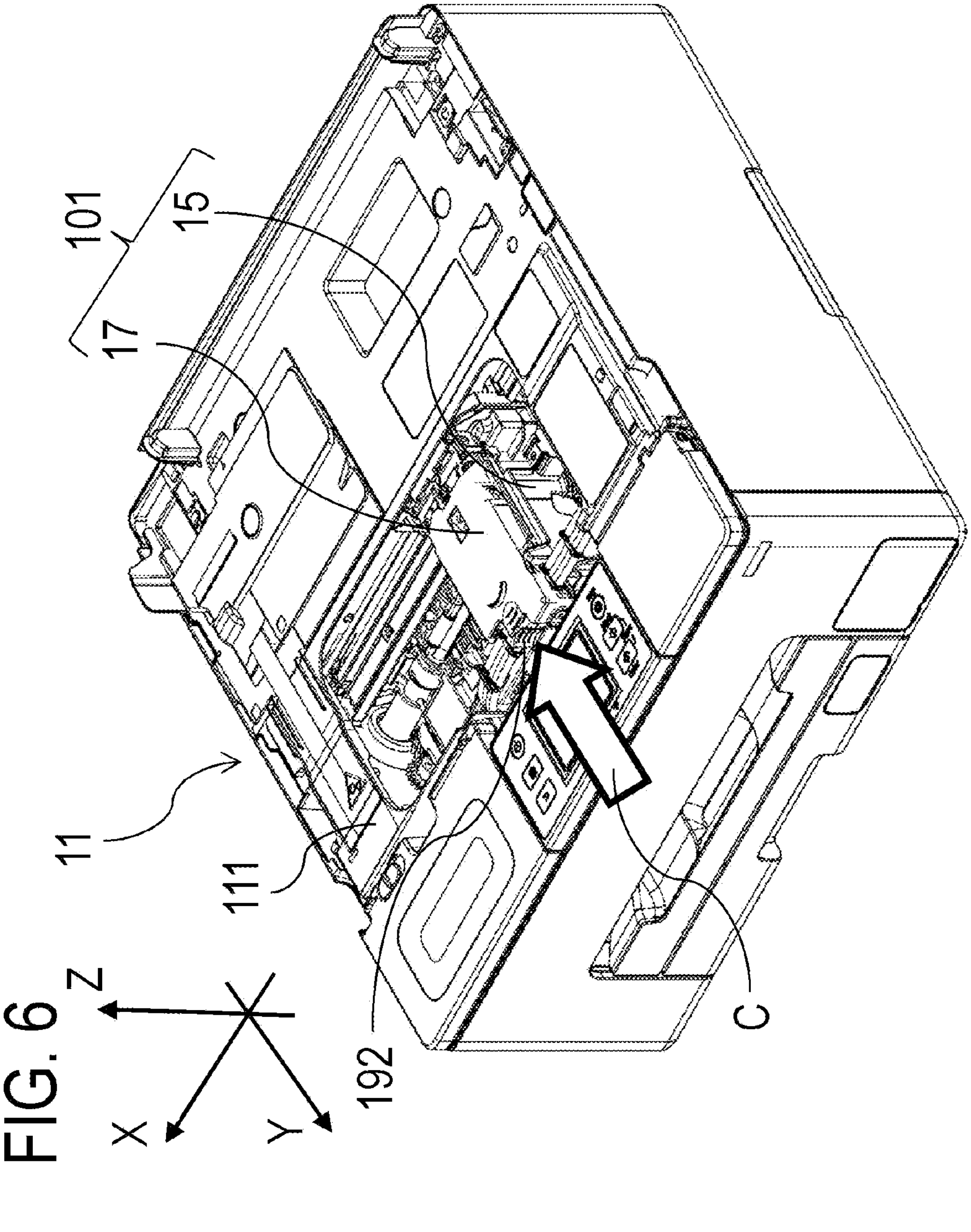
FIG. 6 is a perspective view showing a positional relationship between a housing and the carriage according to the first embodiment.

FIG. 6 is a perspective view of the recording apparatus 11 in which an upper cover has been removed and which shows a positional relationship between a housing 111 and the carriage 101 of the recording apparatus. The housing 111 is a collective term for a cover portion which covers members and units inside the recording apparatus 11 with the exception of the carriage 101 and the peripheral members (such as the belt 18) of the carriage 101. The housing 111 is provided at a position inside the recording apparatus 11 where the housing 111 does not obstruct scanning of the recording head 12 and the carriage 101.

As shown in FIG. 6, the protruded portion 192 is arranged above the carriage 101 in the vertical direction and provided at a position which provides good visibility. In addition, since the protruded portion 192 protrudes upward from the cover 17, the user can open the cover 17 by simply pressing the protruded portion 192 above the cover 17. Furthermore, since the pressing direction of the protruded portion 192 is a direction from the near side toward the far side of the recording apparatus 11 (a direction from a downstream side toward an upstream side in the conveying direction of a recording medium), there is no risk of the finger of the user interfering with the housing 111 in the periphery during an opening operation. Therefore, with the configuration according to the first embodiment, operability of the cover 17 is improved as compared to a configuration in which the operating portion for opening the cover 17 is positioned below the upper surface of the cover 17. In addition, since there is no need to provide an operating space for operating the protruded portion 192 inside the recording apparatus 11, downsizing of the recording apparatus 11 can be achieved.

While the pressing direction C of the protruded portion 192 for releasing the locked state of the cover 17 is constituted of the near-to-far direction (a direction from the near side toward the far side of the recording apparatus 11) in the first embodiment, the present invention is not limited to such a configuration. For example, the pressing direction C of the protruded portion 192 may be the far-to-near direction (a direction from the far side toward the near side of the recording apparatus 11) or the width (X direction) of the recording apparatus 11. In addition, the operating member 19 provided with the locked portion 191 and the protruded portion 192 may be integrally constructed with the cover 17. In consideration thereof, other embodiments according to the present invention will be described below.

Figure 7C:
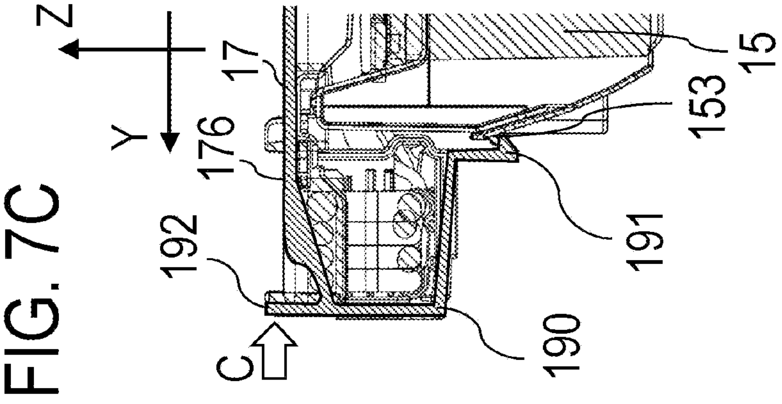
FIGS. 7A to 7C are schematic sectional views of the carriage according to other embodiments.
Figure 7B:
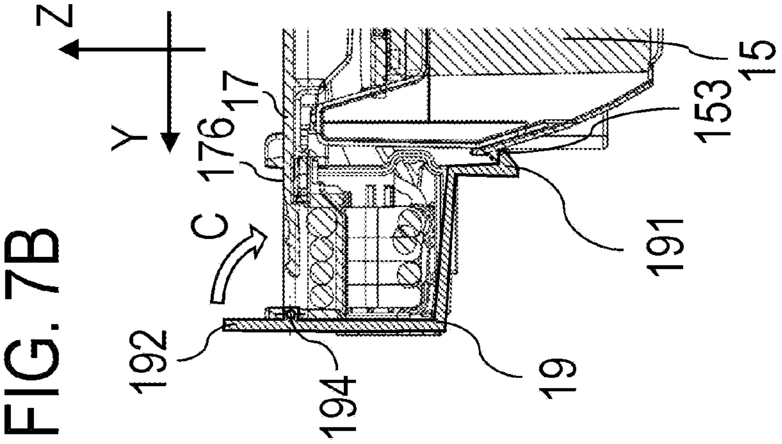
Figure 7A:
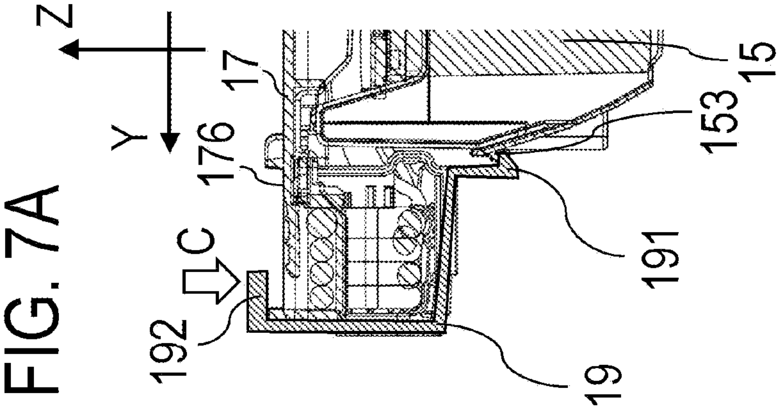

Next, second to fourth embodiments according to the present invention will be described. In the following description, components similar to those of the first embodiment will be denoted by the same reference signs and descriptions thereof will be omitted. FIGS. 7A to 7C are schematic sectional views showing configurations of the carriage 101 according to other embodiments. In FIGS. 7A to 7C, the pressing direction C of the protruded portion 192 for opening the cover 17 is depicted by a blank arrow.

Second Embodiment

FIG. 7A shows a peripheral region of the locked portion 191 and the protruded portion 192 of the carriage 101 according to the second embodiment. While the pressing direction C of the protruded portion 192 in an opening operation of the cover 17 is the Y direction (a direction from the near side toward the far side of the recording apparatus 11) in the first embodiment, the second embodiment adopts a configuration in which the pressing direction C of the protruded portion 192 in an opening operation of the cover 17 is the Z direction (downward in the vertical direction). Even in the second embodiment, the protruded portion 192 protrudes upward from the upper surface 176 of the cover 17.

The protruded portion 192 according to the second embodiment has a shape which protrudes upward from the upper surface 176 of the cover 17 and which is bent toward the far side of the recording apparatus 11. By pressing the bent portion downward in the vertical direction, the attitude of the operating member 19 changes and the engagement between the locked portion 191 and the locking portion 153 is released. As described above, the pressing direction C of the protruded portion 192 for releasing the engagement between the locked portion 191 and the locking portion 153 is not limited to the horizontal direction.

Third Embodiment

FIG. 7B shows a peripheral region of the locked portion 191 and the protruded portion 192 of the carriage 101 according to the third embodiment. While the pressing direction C of the protruded portion 192 in an opening operation of the cover 17 is approximately linear in the first embodiment, the pressing direction C of the protruded portion 192 in an opening operation of the cover 17 is curved in the third embodiment. In other words, the protruded portion 192 according to the third embodiment functions like a lever. Even in the third embodiment, the protruded portion 192 protrudes upward from the upper surface 176 of the cover 17.

The operating member 19 according to the third embodiment is supported by the cover 17 so as to be rotatable around a rotating shaft 194 which extends in the X direction. The rotating shaft 194 is arranged between the protruded portion 192 and the locked portion 191 in the vertical direction in a vicinity of the upper surface 176 of the cover 17. In this manner, since the rotating shaft 194 is arranged in an upper portion of the carriage 101 in the third embodiment, by pressing the protruded portion 192 in a clockwise direction in FIG. 7B, the operating member 19 rotates around the rotating shaft 194. In addition, the operating member 19 rotates in conjunction with the pressing operation of the protruded portion 192 and the engagement between the locked portion 191 and the locking portion 153 is released. In other words, the pressing direction C according to the third embodiment is a rotating direction around the rotating shaft 194 which is parallel to the rotation center line 172 of the cover 17. As described above, the pressing direction C of the protruded portion 192 for releasing the engagement between the locked portion 191 and the locking portion 153 is not limited to a linear direction. In order to keep the engaged state of the locked portion 191 and the locking portion 153, the operating member 19 is preferably urged in an opposite direction to the pressing direction C by an urging member or the like.

Fourth Embodiment

FIG. 7C shows a peripheral region of the locked portion 191 and the protruded portion 192 of the carriage 101 according to the fourth embodiment. While the operating member 19 in which the locked portion 191 and the protruded portion 192 are formed is a separate member from the cover 17 in the first embodiment, the cover 17 is configured as an integrated component including the locked portion 191 and the protruded portion 192 in the fourth embodiment.

Even in the fourth embodiment, the protruded portion 192 protrudes upward from the upper surface 176 of the cover 17.

An operating portion 190 is formed on a distal end side in the cover 17 according to the fourth embodiment and the operating portion 190 extends in the vertical direction. The protruded portion 192 is provided at an upward end of the operating portion 190 and the locked portion 191 is provided at a downward end. A connecting portion between the operating portion 190 and a main body portion including the upper surface 176 of the cover 17 is formed with a narrow width and, due to pressing of the protruded portion 192 in the pressing direction C, the attitude of the operating portion 190 changes so that the engagement between the locked portion 191 and the locking portion 153 is released. In this case, an amount of engagement of the locked portion 191 and the locking portion 153 and a material of the cover 17 are preferably determined so as to prevent the cover 17 from sustaining damage. In this manner, a configuration may be adopted in which the carriage 101 is provided with the cover 17 in which a portion covering an opening of the main body 15 and the protruded portion 192 are constituted of an integrated component.

In addition, while the operating member 19 according to the first embodiment is configured so as to include a function of holding the supply tubes 14 which are flexible members, the operating member 19 may be configured to be capable of holding other flexible members. Examples of other flexible members include a flexible flat cable.

Furthermore, a torsion coil spring into which the rotating shaft 154 is inserted is provided in the first embodiment as the urging member 20 which urges the cover 17 from the closed state to the open state. However, the urging member 20 may be constituted of a rubber member or a resin member which urges the cover 17 instead of a torsion coil spring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-122942, filed on Jul. 28, 2023, which is hereby incorporated by reference herein in its entirety.

What is claimed is:

1. A recording apparatus comprising:

a carriage configured to carry a recording head that discharges a liquid, the carriage including:

(1) a main body which is provided with an opening for internally housing the recording head and which includes a locking portion; and (2) a cover which is rotatable between a closed state, in which the opening is blocked, and an open state, which exposes the opening, and which includes a locked portion that engages with the locking portion in the closed state, wherein the cover includes an operating portion including a protruded portion which protrudes, from an upper surface of the cover constituting an outer wall surface of the carriage and facing upward in a vertical direction, in a rotating direction of the cover from the closed state to the open state, wherein the protruded portion is positioned higher than the upper surface when the cover is in the closed state, wherein, in a case where a side, on which a center of rotation of the cover is positioned, in a radial direction during a rotation of the cover is considered a basal side, and an opposite side to the basal side is considered a distal end side, the protruded portion is provided on the distal end side of the cover, and wherein the operating portion has an attitude which changes so that an engagement between the locked portion and the locking portion is released due to the protruded portion being pressed.

2. The recording apparatus according to claim 1, wherein a pressing direction of the protruded portion for releasing an engagement between the locked portion and the locking portion is a direction from the distal end side toward the basal side.

3. The recording apparatus according to claim 2, wherein the protruded portion includes a surface which is oriented in the radial direction and which is depressed from the distal end side toward the basal side.

4. The recording apparatus according to claim 1, wherein a pressing direction of the protruded portion for releasing an engagement between the locked portion and the locking portion is a horizontal direction.

5. The recording apparatus according to claim 1, wherein a pressing direction of the protruded portion for releasing an engagement between the locked portion and the locking portion is downward in a vertical direction.

6. The recording apparatus according to claim 1, wherein a pressing direction of the protruded portion for releasing an engagement between the locked portion and the locking portion is a rotating direction around a rotational axis which is parallel to a rotation center line of the cover.

7. The recording apparatus according to claim 1, wherein the recording apparatus records an image on a recording medium by discharging a liquid onto the recording medium with the recording head while conveying the recording medium in a conveying direction, and wherein a pressing direction of the protruded portion for releasing an engagement between the locked portion and the locking portion is an opposite direction to the conveying direction.

8. The recording apparatus according to claim 1, wherein the operating portion is colored differently from the main body.

9. The recording apparatus according to claim 1, further comprising: an urging member which urges the cover in the rotating direction.

10. The recording apparatus according to claim 1, wherein a surface oriented in the rotating direction of the cover is provided with a depressed portion which is depressed in an opposite direction to the rotating direction.

11. The recording apparatus according to claim 10, wherein the depressed portion is provided on the distal end side of the cover.

12. The recording apparatus according to claim 1, further comprising:

an ink housing portion which internally houses ink and a supplying member for supplying ink to the recording head from the ink housing portion, wherein the cover includes a connecting portion which connects the supplying member and the carriage to each other.

13. The recording apparatus according to claim 12, wherein the supplying member is a flexible member, and wherein the cover includes a holding portion which holds the supplying member.

14. The recording apparatus according to claim 13, wherein the cover is constituted of a cover main body and a holding member provided with the holding portion, the holding member being attachable to and detachable from the cover main body, and wherein the holding member includes the operating portion.

15. The recording apparatus according to claim 1, wherein the cover is constituted of a cover main body and an operating member which includes the operating portion and which is connected to the cover main body.

16. The recording apparatus according to claim 15, wherein the protruded portion is colored differently from the cover main body.

17. The recording apparatus according to claim 1, wherein a portion which covers the opening of the main body of the cover and the protruded portion are constituted of an integrated component.

18. The recording apparatus according to claim 1, wherein the upper surface of the cover is provided with a hooking portion configured to be hooked by a finger of a user, and wherein the hooking portion protrudes from the upper surface in the rotating direction of the cover.

* * * * *